United States Patent [19]
Ruocco et al.

[11] Patent Number: 5,864,855
[45] Date of Patent: Jan. 26, 1999

[54] PARALLEL DOCUMENT CLUSTERING PROCESS

[75] Inventors: Anthony S. Ruocco, Chantilly; Ophir Frieder, Fairfax, both of Va.

[73] Assignee: The United States of America as represented by the Secretary of the Army, Washington, D.C.

[21] Appl. No.: 606,951

[22] Filed: Feb. 26, 1996

[51] Int. Cl.[6] .................................................. G06F 17/30
[52] U.S. Cl. ..................... 707/10; 707/5; 707/6
[58] Field of Search ..................... 395/611, 602, 395/605; 707/100, 2, 5, 10

[56] References Cited

U.S. PATENT DOCUMENTS

| | | | |
|---|---|---|---|
| 5,058,002 | 10/1991 | Nakamura et al. | 707/1 |
| 5,317,507 | 5/1994 | Gallant | 707/532 |
| 5,442,778 | 8/1995 | Pedersen et al. | 707/5 |
| 5,619,709 | 4/1997 | Caid et al. | 707/532 |
| 5,675,819 | 10/1997 | Schuetze | 704/10 |

OTHER PUBLICATIONS http://lcs.www.media.mit.edu/people/foner/Yenta/vector–space–clustering.html obtained of the internet, Dec. 13, 1994.

Bobbie, P.O., "Clustering Relations of Large Databases for Parallel Querying", IEEE Proceedings of the Twenty–Seventh Hawaii Int. Conf. on System Sciences. vol.III: Software Technology, pp. 246–252, Jan. 4, 1994.

Chehadeh et al., "Application for parallel disks for Eficient Handling of Object–Oriented Databases", Proceedings of the Fifth IEEE Symposium on Paralel and Distributed Processings, pp. 184–191, Dec. 1, 1993.

Cheng et al., "Clusterung Analyzer", IEEE Transactions on Circuit and Systems vol.38 Iss. 1, pp. 124–128, Jan. 1991.

Omiecinski et al., "Performance Analysis of a Concurrent File Reorganization Algorithm for Record Clustering", IEEE Transactions on Knowledge and Data Engineering vol.6 iss.2, pp. 248–257, Apr. 1994.

*Primary Examiner*—Thomas G. Black
*Assistant Examiner*—Greta L. Robinson
*Attorney, Agent, or Firm*—Werten F. W. Bellamy

[57] ABSTRACT

A computer information processing system utilizes parallel processors for organizing and clustering a large number of documents into a large number of clusters for information analysis and retrieval. After the documents are translated into electronic digital documents, each document is converted into a vector based on weighted list of the occurence of different words and terms that appear in the document. The document vectors are grouped together into cluster vectors on different parallel processors according to similarities. New document vectors are simultaneously compared with existing cluster vectors in the different parallel processors.

1 Claim, 9 Drawing Sheets

Step 1: Document Vector 1 forms Cluster 1 on Processor 1

Step 2: Document Vector 2 is compared to Cluster 1 and may form cluster 2 on Processor 2

Step 3: Document Vector 3 is compared to Cluster 1 and Cluster 2 simultaneously and may form cluster 3 on Processor 3 (Process repeats for all documents)

FIG. 1a
PRIOR ART

Document is "data base management system"

| Form term signatures: | data | 0000 0010 0000 1000 |
|---|---|---|
| | base | 0100 0010 0000 0000 |
| | management | 0000 0100 0001 0000 |
| | system | 0000 0000 0101 0000 |

FIG. 1b
PRIOR ART

Form document signature by Oring each column 0100 0110 0101 0000

FIG. 2a
PRIOR ART

Keyword-Boolean matrix for keywords APPLE, ORANGE, BANANA, GRAPE

| Terms  | D0 | D1 | D2 | D3 | D4 | D5 | D6 | D7 | D8 | D9 |
|--------|----|----|----|----|----|----|----|----|----|----|
| APPLE  | 1  | 0  | 1  | 0  | 1  | 0  | 1  | 0  | 0  | 0  |
| BANANA | 0  | 0  | 0  | 1  | 0  | 1  | 0  | 1  | 0  | 0  |
| GRAPE  | 0  | 0  | 1  | 0  | 0  | 0  | 1  | 0  | 1  | 1  |
| ORANGE | 0  | 1  | 1  | 1  | 1  | 1  | 0  | 0  | 0  | 0  |

FIG. 2b
PRIOR ART

Inverted index for same terms:

| Terms  | Documents          |
|--------|--------------------|
| APPLE  | D0, D2, D4, D6     |
| BANANA | D3, D5, D7         |
| GRAPE  | D2, D6, D8, D9     |
| ORANGE | D1, D2, D3, D4, D5 |

FIG. 3
Step 1: Document Vector 1 forms Cluster 1 on Processor 1
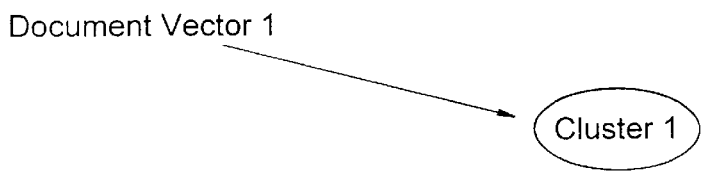
Step 2: Document Vector 2 is compared to Cluster 1 and may form cluster 2 on Processor 2
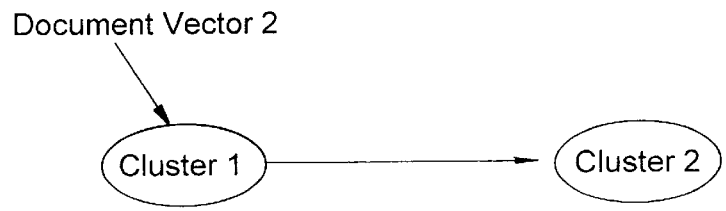
Step 3: Document Vector 3 is compared to Cluster 1 and Cluster 2 simultaneously and may form cluster 3 on Processor 3 (Process repeats for all documents)
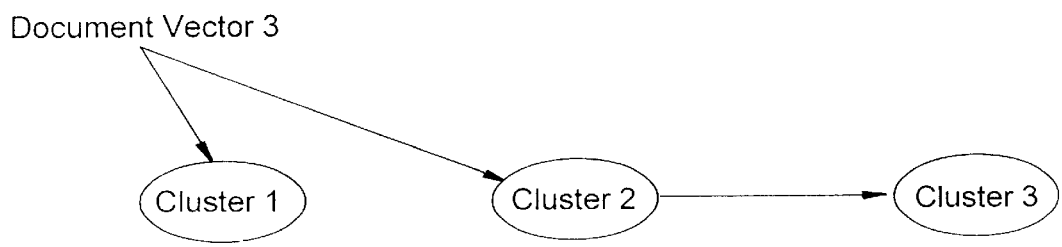

TIMES TO PERFORM CLUSTERING FOR [D,TA,C,1]

——— $T1\_32_j$

---------- $T1\_64_j$

– – – $T1\_128_j$

TIMES TO FORM CLUSTERS AND SPEEDUP FOR [D, TA, C, 2]

——— $T2\_32_j$
·········· $T2\_64_j$
— — — $T2\_128_j$

——— $S32_j$
·········· $S64_j$
— — — $S128_j$

TIMES TO FORM CLUSTERS AND SPEEDUP FOR $[D, TA, C, 4]$

——— $T4\_32_j$
·········· $T4\_64_j$
— — — $T4\_128_j$

——— $S32_j$
·········· $S64_j$
— — — $S128_j$

TIMES TO FORM CLUSTERS AND SPEEDUP FOR [$D$, TA, $C$, 16]

— T16_32$_j$
----- T16_64$_j$
– – – T16_128$_j$

— S32$_j$
----- S64$_j$
– – – S128$_j$

TIMES TO FORM CLUSTERS AND SPEEDUP FOR [D, TA, 0.8, L]

——— T32$_j$
--------- T64$_j$
— — — T128$_j$

——— S32$_j$
--------- S64$_j$
— — — S128$_j$

PARALLEL DOCUMENT CLUSTERING PROCESS

FIELD OF INVENTION

The present invention relates to a clustering process to organize a vast amount of text-based documents into related groups of generally accepted clusters for subsequent query-driven retrieval and information analysis.

REFERENCES

Publications

[CHEN92] Chen, H., K. Lynch (1992) "Automatic Construction of Networks of Concepts Characterizing Document Databases," *IEEE Transactions on Systems, Man, and Cybernetics*, 22(5), pp 885–902.

[DAHL92] Dahlhaus, E. (1992) "Fast Parallel Algorithm for the Single Link Heuristics of Hierarchial Clustering," *Proceedings of the Fourth IEEE Symposium on Parallel and Distributed Processing*, pp 184–187.

[JAIN88] Jain, A. K and R. C. Dubes (1988), *Algorithms for Clustering Data*, Englewood Cliffs, N.J.: Prentice Hall.

[LI90] Li, X. (1990) "Parallel Algorithms for Hierarchial Clustering and Cluster Validation," *IEEE Transactions on Pattern Analysis and Machine Intelligence*, 12(11), pp 1088–1092.

[MURT92] Murtagh, F. (1992), "Comments on 'Parallel Algorithms for Hierarchial Clustering and Cluster Validation'", *IEEE Transactions on Pattern Analysis and Machine Intelligence*, 14(10), pp 1056–1057.

[SALT83] Salton, Gerald and Michael J. McGill (1983). *Introduction to Modern Information Retrieval*. New York, N.Y.: McGraw-Hill.

[SALT89] Salton, Gerald (1989). *Automatic Text Processing*. Reading, Mass.: Addison-Wesley.

[TIBE93] Tiberio, P. and P. Zezula (1993). "Selecting Signature Files for Specific Applications," *Information Processing and Management*, 29(6), pp 487–498.

DESCRIPTION OF DIAGRAMS

A complete appreciation of the invention and its advantages can be attained by reference to the background leading to the invention and the summary and detailed description of the invention when considered in conjunction with the accompanying drawings:

FIG. 1 shows the formation of a signature file.

FIG. 2 shows the formation of a keyword-Boolean matrix and inverted index.

FIG. 3 provides a general overview of the invention's operation

Figure 4:
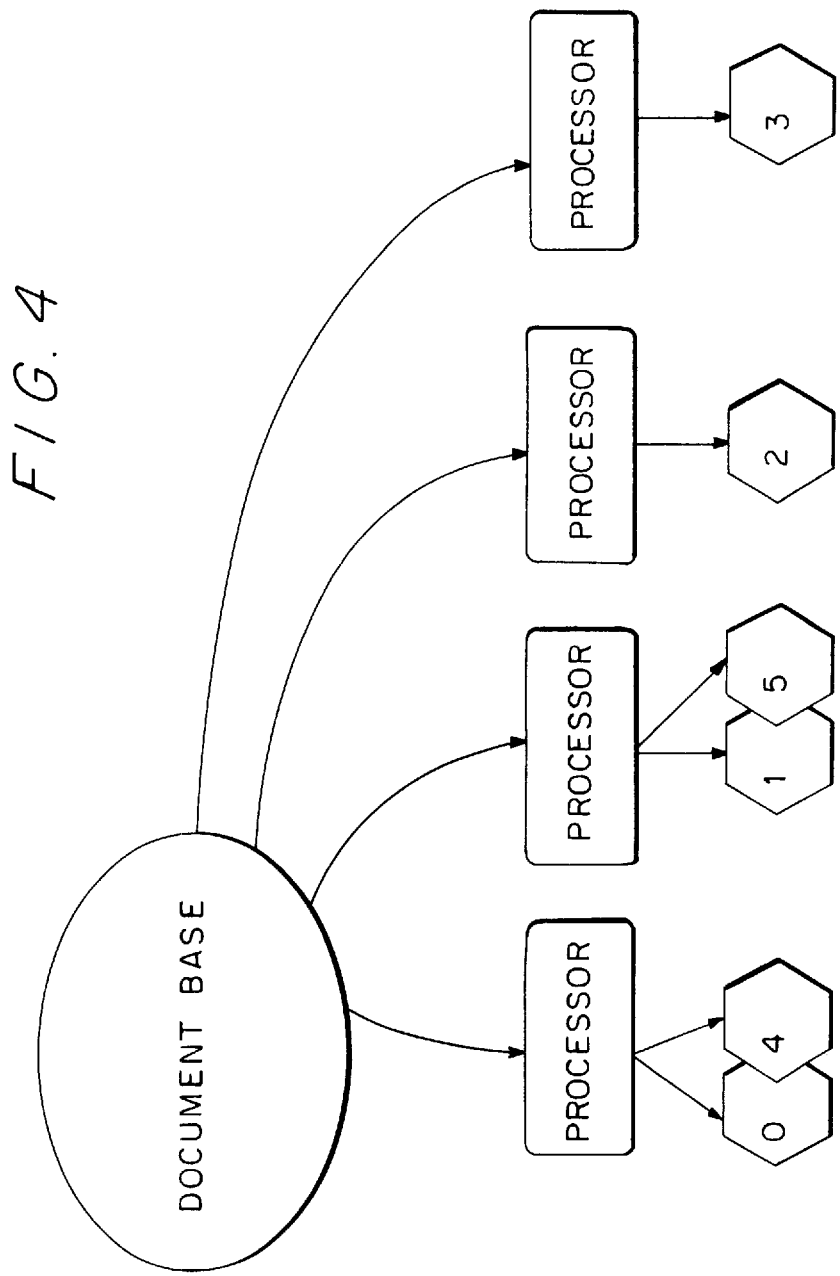

FIG. 4 provides a generalized result of the invention.

Figure 5:
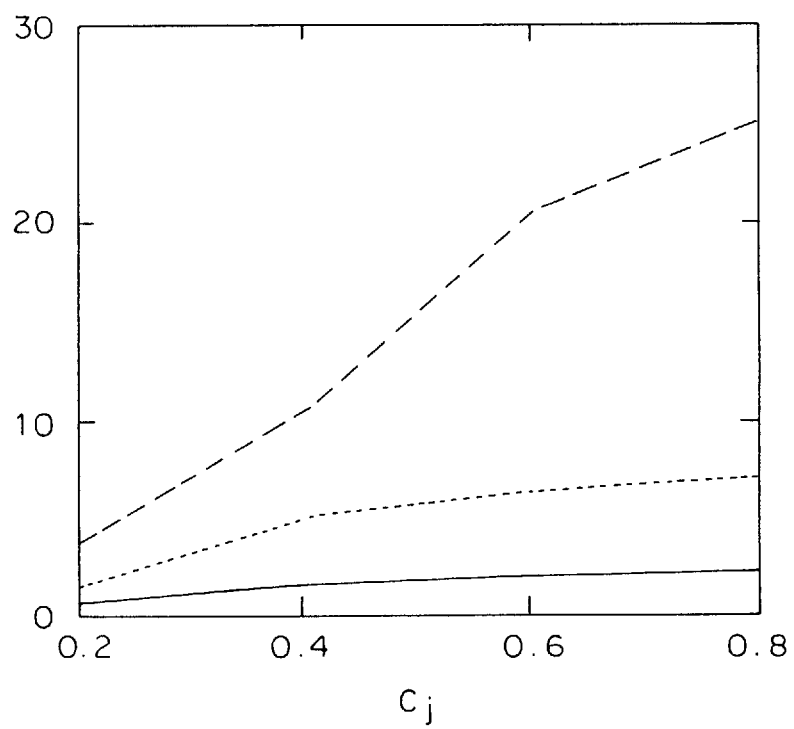

FIG. 5 shows time to form clusters on 1 processor.

Figure 6A:
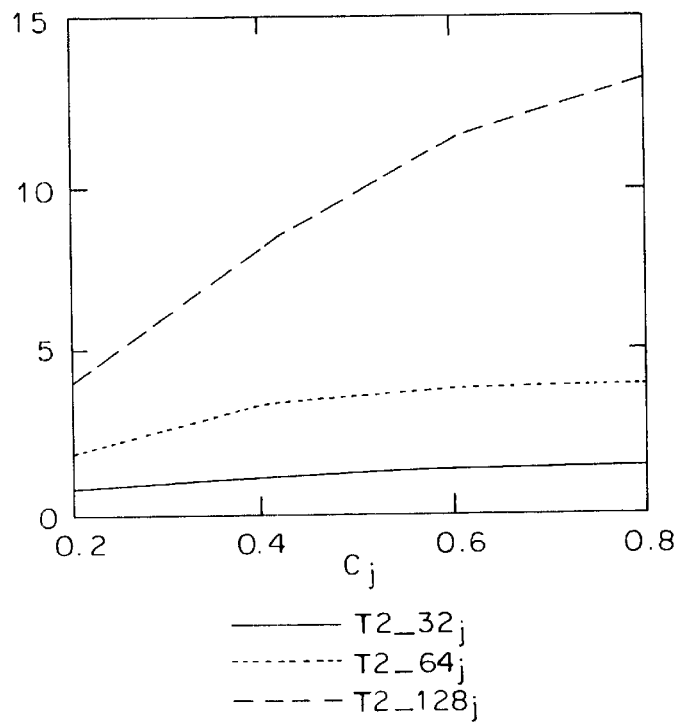
Figure 6B:
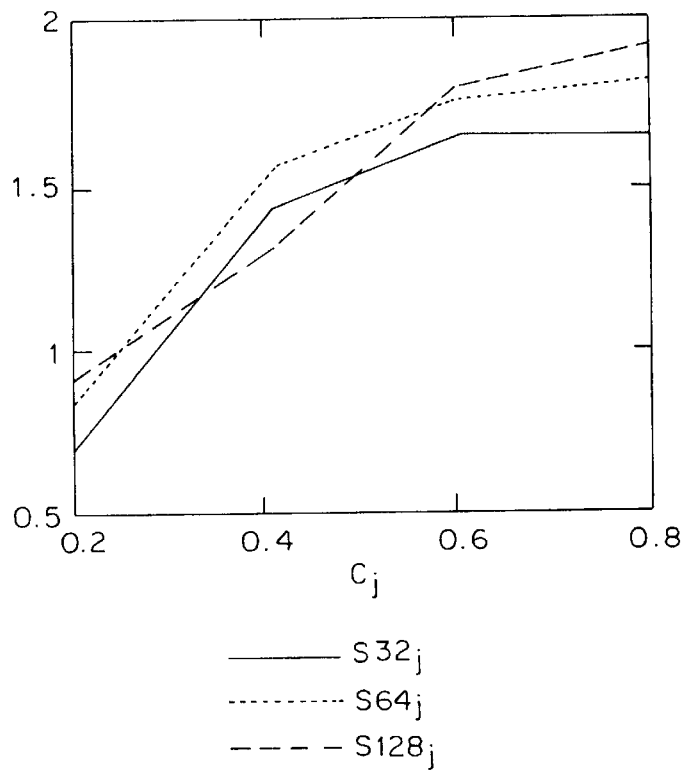

FIG. 6 shows time to form clusters and speedup for 2 processors.

Figure 7A:
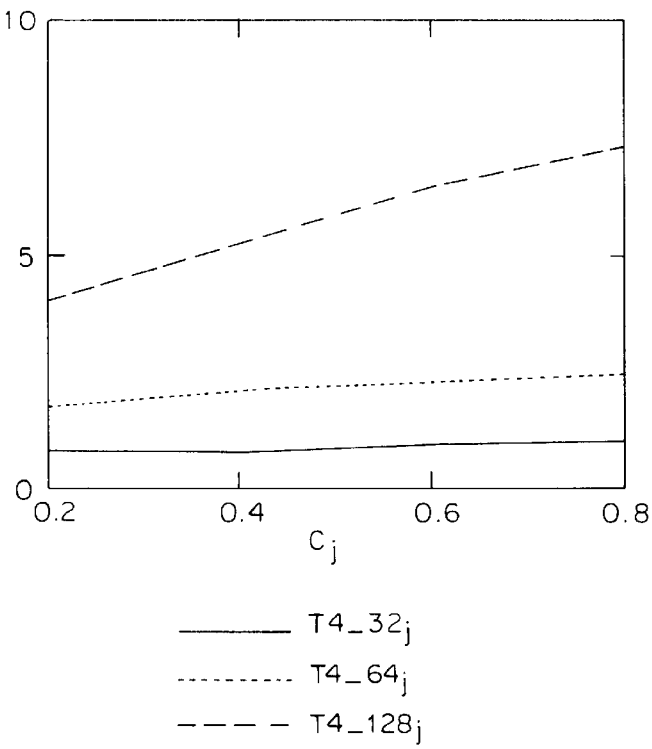
Figure 7B:
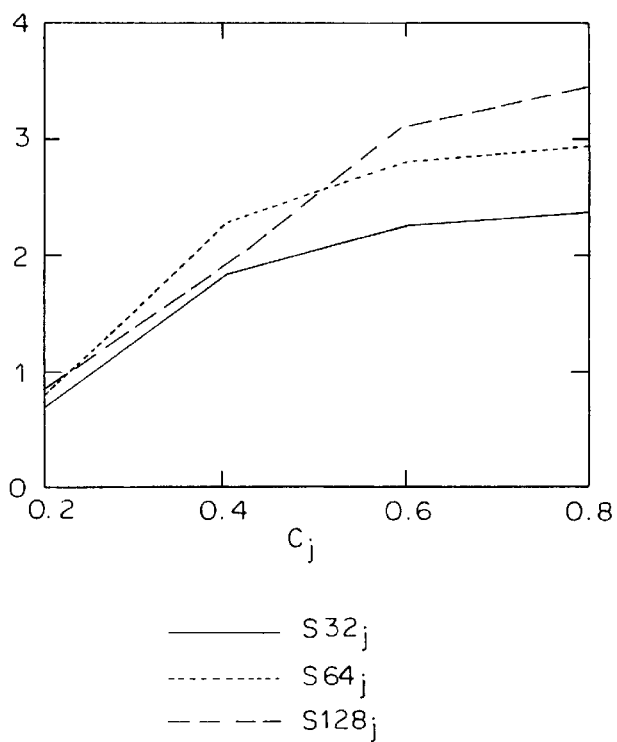

FIG. 7 shows time to form clusters and speedup for 4 processors.

Figure 8A:
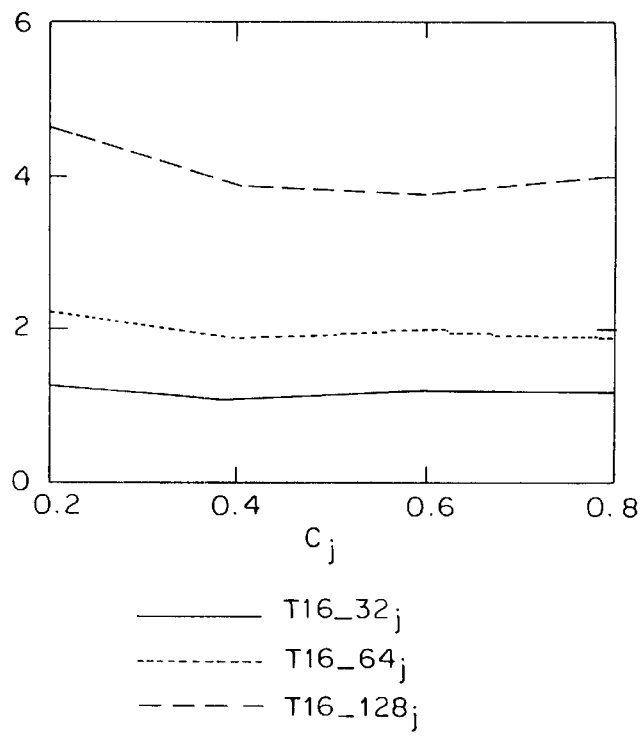
Figure 8B:
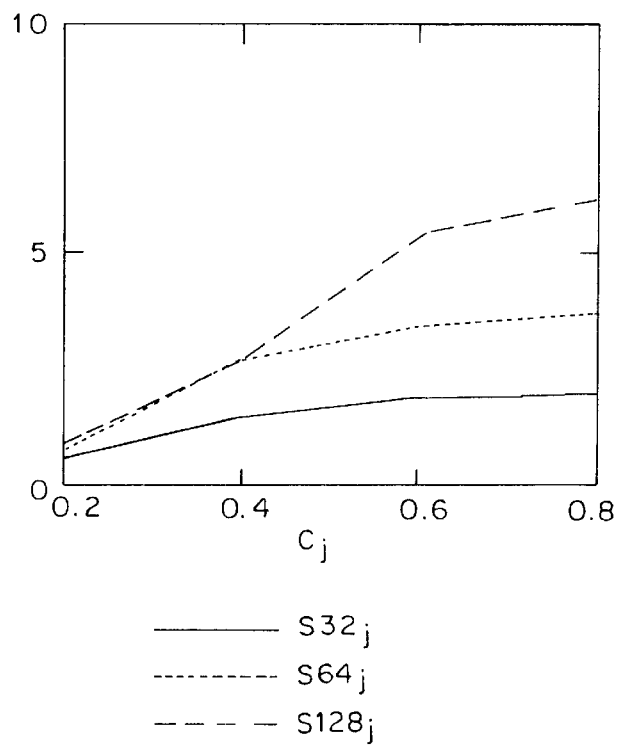

FIG. 8 shows time to form clusters and speedup for 16 processors.

Figure 9A:
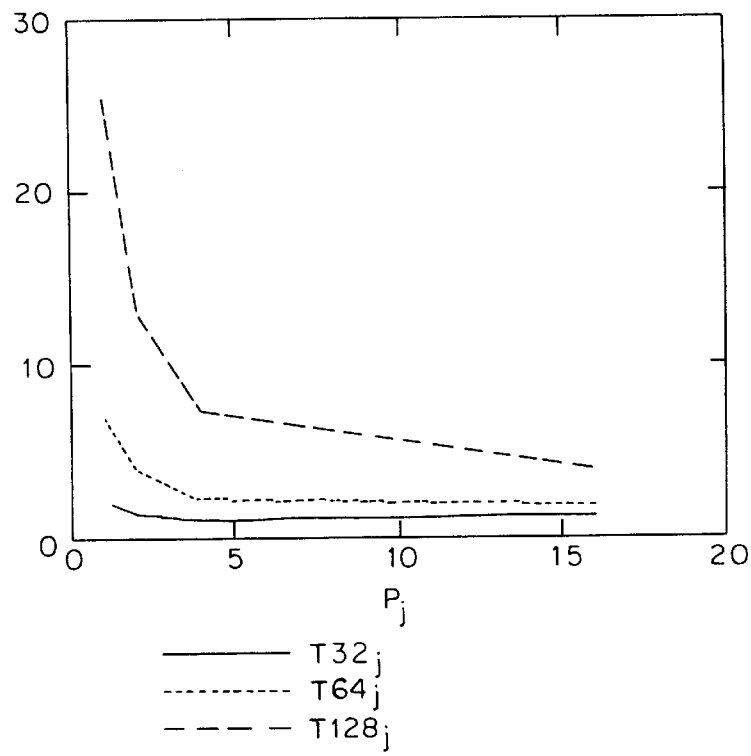
Figure 9B:
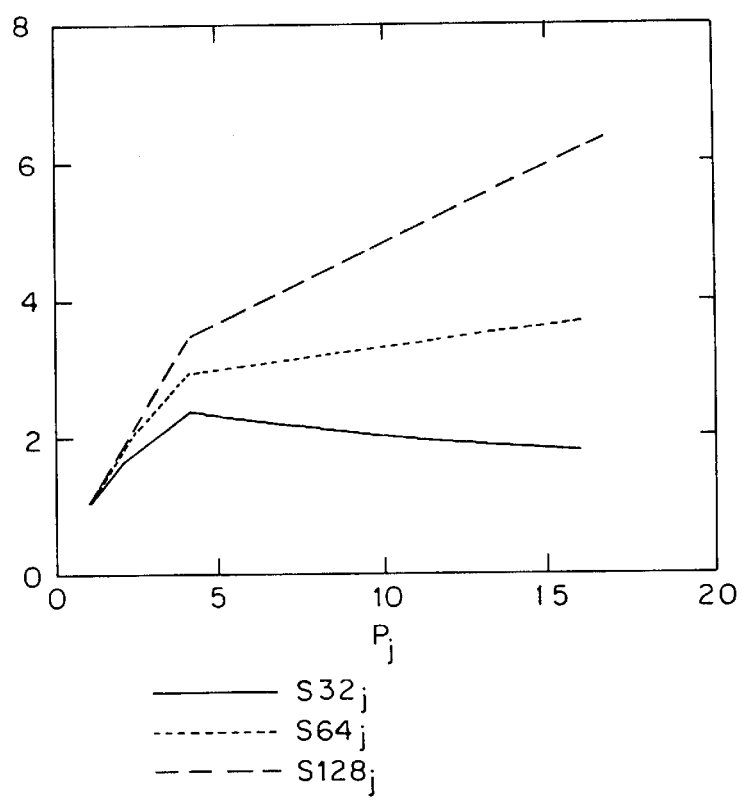

FIG. 9 shows times to form clusters and speedup across processors.

Table 1 is the number of clusters for each permutation of the Wall Street Journal Set.

Table 2 is the time to make the clusters with 1 processor.

Table 3 is the time to make the clusters with 2 processors.

Table 4 is the time to make the clusters with 4 processors.

Table 5 is the time to make the clusters with 16 processors.

Table 6 represents the speedup of 2 processors over 1 processor.

Table 7 represents the speedup of 4 processors over 1 processor.

Table 8 represents the speedup of 16 processors over 1 processor.

Table 9 represents the efficiency of using 2 processors.

Table 10 represents the efficiency of using 4 processors.

Table 11 represents the efficiency of using 16 processors.

BACKGROUND OF INVENTION

Information retrieval is the process of retrieving documents which are relevant to a query generated by a user. There are four dominate models for information retrieval: full-text scanning, keyword-Boolean operations, signature files, and vector-space. The models can be characterized as either formatted or unformatted. An unformatted model takes each document exactly as it appears in the document set. In other words, the document does not undergo any processing into a different form. Formatted models process the documents into a separate form or data structure. Query processing is done with separate forms or data structures.

One model is full-text scanning. This model takes a phrase from the user and searches each document in a collection for an exact match. This model is unformatted, hence each document must be completely scanned with each query. There are some efficient algorithms for text scanning. However this model, in general, is only used in small document sets where the user is familiar with the documents, i.e., personal files.

Formatted models take a document and convert them to some other form. Usually, this form is based on an ability to discriminate among documents. One way to discriminate is to identify words within the documents and build the formatted structure from discriminating words. These words are frequently referred to as descriptors. In many cases, descriptors are reduced to word stems. In other words, terms like "engineer", "engineering", or "engineered" would all reduce to the stem "engineer".

A signature file is formed from the signatures of a document set. To form a signature, each term in a document is converted to a standard size term consisting of 0's and 1's. Once each term is converted, the document signature is formed by performing an ORing operation. FIG. 1 details the formation of a document signature. To perform a query, the query is converted to a query signature. This signature is compared to each document signature. A match occurs if a "1" in the query signature can be aligned with a "1" in a document query. Unfortunately, if there is a match it is unknown if the match occurs because the document matches the query or simply because the process of conversions attributed to the alignment. A document which is retrieved due to alignment based on the conversion process yet does not match the actual query is called a "false hit". Signature files tend to be used as a filtering process which retrieves potential matches with some other process use to screen false hits from the retrieved set.

Keyword-Boolean models typically are represented by a matrix where the columns represent documents and the rows represent keywords. If a keyword appears in a document then the row corresponding to the term and the column corresponding to the document has a "1" placed in it. FIG. 2a shows a typical Boolean model matrix. A query is formulated using the Boolean operators AND, OR, NOT. Each term in the query is compared to the matrix. If a "1" appears in the [row, column] corresponding to the [term, document] that document is placed into a set of potential documents. Once documents are placed in the set the Boolean operations are performed. In effect the set of potential documents is pared down to the final set presented to the user. However, for each query, each term must be tested for in each document. Searching can be made more efficient by the use of an inverted index, An inverted index for information retrieval is much the same as the index of a textbook. It identifies keywords and indicates which documents contain those keywords. FIG. 2b shows a scheme for an inverted index. While improving searching time, the indices themselves can be very large. Keyword-Boolean systems are dependent on the indexing scheme. If a term is not a keyword, there is no way to query for that term within documents. If a new word is added to the index, each document may need to be re-examined to identify if the document contains the new term. Assigning the keywords as descriptors of documents is a complex problem [TIBE93]. It has been shown that the probability of two people using the same descriptors to categorize a document is low (10–20%) [CHEN92].

The last model to be discussed is the vector-space model. In this model, each document is considered to be a collection of terms. The number of times each word occurs is considered that term's weight. The terms and weights for each document can be organized into a document vector consisting of n-dimensions, where n is the number of terms. A query is also a collection of terms. A query can be converted into a query-vector and the query vector is compared to the document vector. Document and query vectors are compared using vector operations and if some threshold of similarity is reached, the document is considered for retrieval. Typical measures of similarity are the Cosine, Dice, or Jacquard similarity measures.

The formatted models (signature files, keyword-Boolean Operations, Vector-Space) process the documents to form different data structures. These data structures ignore the relationships between the words in a document. If word concordance is a concern, some additional data structure must be maintained. Word count, or the number of times a given word occurs in a document, is lost in signature files, and in Boolean models. Word count can be considered as inherent in the value of attributes in the vector-space model.

All the models have been described in terms of how documents compare to a query. However, none of the models describe how documents relate to each other. The signature file model, the text scanning model, and the Boolean models simply do not have capabilities to relate documents to each other. The Vector-space model, with its ability to measure similarity is readily capable of determining how documents compare to each other. This ability forms the underlying premise of the idea of clustering.

The basic idea of clustering is that items which are similar can be grouped together. Each group, or cluster, has a centroid vector, which is the average of the document vectors making up the cluster. Query vectors are compared to the cluster centroids, if a match is determined, the entire cluster is retrieved. Clusters can reduce the search requirement as each centroid contains information about numerous documents.

Clustering has been used in retrieval systems. However, it has always been done in a sequential fashion. As new documents are added to a collection they are not immediately available to the user. Instead they are held until such time as a sufficient number of new documents have been acquired. Then, in an off line process, the new documents and old documents go through the clustering process. This results in a new set of cluster centroids. The new set of cluster centroids is eventually provided to the user as a new release or version. As document sets increase, the amount of time between versions increases as well. However, if a document set doubles, it takes four times as long to form the new clusters. This can result in an unacceptable time delay from the time a new document is acquired to the time a user actually has access to that document. The Parallel Document Clustering Process can greatly reduce this time.

SUMMARY OF INVENTION

It is the object of this invention to provide an efficient method of organizing a large body of documents into clusters for subsequent retrieval.

It is a further object of the invention to provide a fast method of clustering to reduce the amount of time a document waits from its receipt into the document set until it is available for retrieval by users.

A more specific object of the invention is to perform the process on any available multiple processor (parallel) machine.

The invention is a process for forming clusters of large document sets using multiple processor machines. The process is useful for identifying similarity amongst documents and for subsequent use in document retrieval systems. For demonstration purposes, the Single-Pass Heuristic is used as the clustering method. This method is generally accepted within the information retrieval community.

Text documents are converted to document vectors. Clusters of documents are represented by cluster vectors which have the same format as document vectors. A cluster vector is made by taking the numerical average of all the documents which comprise the cluster. A document vector is compared to each cluster vector. As soon as a determination is made that the document is similar to a cluster, the comparisons stop and the document is added to that cluster. In the event a document is not similar to any cluster, a new cluster is formed.

The invention follows the same tenets of forming a document vector which is compared to cluster vectors. However, the key innovation is that instead of comparing a document vector to a single cluster, it compares the document vector simultaneously with P clusters, where P is the number of processors within the system. Each processor is responsible for creating and maintaining certain clusters. Each processor uses the same document vector. The processor compares this document vector to each of its clusters. When a sufficient threshold of similarity is exceeded, the processor records which cluster vector is similar to the document vector. When all processors have compared the document vector, a decision is reached to determine to which cluster the document vector is added to. If a determination is made that the document was not similar to any existing cluster, a processor is designated to create a new cluster.

By way of example, the process begins by converting the first document vector into a cluster vector. This vector is stored in processor 1. The next document is compared to this vector. Assuming the threshold is not exceeded, the process forms cluster 2 on processor 2. The third document is now compared simultaneously with cluster 1 and 2. If the document cannot be added to either cluster, then cluster 3 is formed on processor 3. The next document is now compared simultaneously with cluster 1, cluster 2 and cluster 3. This process continues until all documents in the set are placed into appropriate clusters. FIG. 3 shows this process. While there is no theoretic limit to the number of processors, a claim of the invention is that it performs on realistic, existing machines. Therefore, each processor may be responsible for more than one cluster. FIG. 4 shows the overall effect of the process on a machine with 4 processors.

DETAILED PROCESS

Each text document is scanned to create a document vector, Stop words are removed and the number of times each word appears in a document is counted. Each unique word in a document is given an administrative number based on a master dictionary. The document vector is basically a set of paired numbers. The first pair indicates the total number of words in the document and the second number of the pair represents the number of unique words within the document. Each subsequent pair is made of up the number of appearances of a word and the administrative number of that word. Formation of the document vector is done off line and is not part of the invention. Each cluster has a uniquely designated global number. The cluster centroid vector has the same form as a document vector. That is a series of paired numbers. The first pair represents the total number of words in the cluster and the total number of unique words in the cluster. Each subsequent pair is made of up the number of appearances of a word and the administrative number of that word. The cluster vector is formed as the mathematical average of the document vectors within the cluster. The following formula shows how each element of a document vector is added to its corresponding element in a cluster vector:

$$\frac{c_{j,i} + y_i}{C_{j,N}} \quad (1)$$

$c_{j,i}$ = Weight of appearances of word $i$ within cluster $C_j$ $y_i$ = Weight of appearances word $i$ within document $Y$ $N$ = Number of documents within cluster $C_j$ Weight based on appearances of term $i$/ total words of cluster or document

Clusters are formed based on a similarity measure between the cluster centroid and a document vector. One popular similarity measure is the COSINE measure based on the formula:

$$\text{COSINE}(C_j, Y) = \frac{\Sigma c_{j,i} y_i}{\sqrt{\Sigma c_{j,i}^2 \Sigma y_i^2}} \quad (2)$$

$c_{j,i}$ = weight of $i$th term of cluster $C_j$ $y_i$ = weight of $i$th term of document $Y$ If COSINE($C_j$,Y) exceeds a threshold (ranging from 0 to 1), the document and cluster are considered to be similar. The document is added to the cluster using equation 1. Every cluster C is compared to document Y until either the threshold is exceeded or all clusters have been checked. In the latter case, a new cluster is formed. Forming a new cluster is very simple. The document vector is simply redesignated as a cluster and given a number. To put the threshold into perspective, a threshold of 0 implies that any document will match a cluster. A threshold of 1 implies that only documents which have exactly the same words and exactly the same number of appearances of those words will be considered similar.

Each processor accesses the same document vector at the same time. Using equation (2), a processor determines if a document is similar to any of its clusters. It is possible for a document vector to be similar to more than one cluster. However, the tenets of the Single-Pass method are such that a document is only placed into the first cluster which exceeds the threshold. For the invention to produce the same results as the Single-Pass, there must be communications among the processors to determine which cluster was the first to have the threshold exceeded. It is important to note that the use of the term "first cluster" is based on the order the clusters were formed. Cluster 1 is formed before cluster 2, which is formed before cluster 3, etc. Since the clusters are numbered globally, the cluster with the lowest global number is determined to be the cluster which incorporates the document. So if processor 2 reports the threshold was exceeded with cluster 7 and processor 5 reports that the threshold was exceeded on cluster 5 then the document is added to cluster 5. This assignment occurs even if the actual computations by processor 2 where finished ahead of processor 5. If no cluster is found, the system generates a new cluster and one of the processors takes responsibility for the cluster. Clusters are apportioned to processors in a modulus fashion, that is:

$$P_{cluster\ i} = i \bmod P_t \quad (3)$$

Where:

$P_{cluster\ i}$ is the Processor designated for cluster $i$ $i$ is the cluster being formed $P_T$ is the total number of processors within the system The invention was used with a set of articles from the Wall Street Journal. The articles were written at different times of the year, by different reporters, and cover an assortment of topics. They are also of varying lengths. In other words, the document set is not categorized into any preestablished category, such as, computer oriented, financially oriented, legally oriented, etc. The documents were formed into individual document vectors and each is stored as a separate file with a unique file name. There is a master file which contains the file names of the document vectors. When the vectors were formed stop words were removed but there was no stemming. Stemming can be easily incorporated into the scheme if desired as all conversion from text format to vector format is outside the scope of the invention.

There are several parameters which must be established prior to executing the process. These are:

a) D, the number of documents in the document set.

b) O, the order in which document vectors are accessed for comparison.

c) C, the threshold value of the COSINE coefficient.

d) P, the number of processors in the actual system.

The Single-Pass method places a document into the first cluster which exceeds the threshold. This has two very characteristic results. The first characteristic is that the clusters which are formed first tend to be larger (contain more documents) than clusters which are formed later in the process. The second characteristic is that the process is order-dependent. That means if the order in which the document vectors are compared changes, the clusters may change as well. These two characteristics are known and generally accepted as a by-product of the Single-Pass method. To show the generality of the invention, results are based on five different orderings of the document set. The ordering of the document vectors is done through manipulation of the master file of document vectors.

The first runs were done with a random ordering (R) of the documents. Basically, this can be considered as taldng the documents in the order in which they arrived to the system. While the document vectors are formed, little is known about their content. However, once a document vector is formed, it is very easy to identify two characteristics. The first characteristic is the total number of words in the vector and the second characteristic is the number of unique words in the document vector. These values are provided by the first numbered pair of the document vector. With this information, it is possible to arrange the document vectors based on total words or number of unique words. This being the case, the document vectors were ordered by total words in ascending order (TA) and descending order (TD). Ordering was also done based on number of unique words in ascending order and descending order, UA, and UD, respectively.

The threshold coefficient is the basis of comparison between a document and a cluster. If the cosine exceeds this threshold, the document and cluster are deemed to be similar. The coefficient can range from 0.0 to 1.0. The higher the value, the more similar a document must be in order to be added to a cluster. While the range can be 0.0 to 1.0, values at the extremes have little meaning. A value of 0.0 implies that there will be a single cluster incorporating all the documents. A value of 1.0 would basically filter all the documents and only cluster those which are duplicates. The invention was run on coefficients of 0.2, 0.4, 0.6, and 0.8.

The intent of the invention is to be used with large document sets. To show the effect of the invention as document set size increases, document sets of 32, 64 and 128 were used. These sets were run at each of the four coefficients and in each of the five different orders.

The last parameter to be established is the number of processors to use. While there is no theoretic limit to the number of processors, the intent of the invention is to show the effectiveness on a real, practical, and commercially available machine. The process was run initially on 1 processor. This indicates the time the process would take on a regular, sequential machine. The process was run on machines consisting of 1, 2, 4, and 16 processors. A run then consists of a combination of the four parameters [D, O, C, P ]. In total, there were 240 permutations run, each permutation was run 5 times. Results are based on the average of these runs.

The initial runs were used to establish the number of clusters. In general, the fewer the clusters, the broader the scope of those clusters. The more clusters there are, the more specific the scope of the clusters. Correspondingly, there tend to be more clusters at higher values of the coefficient. There is no direct link between selecting a coefficient and the desire to form a specific number of clusters. Table 1 provides the results of the clustering process itself. It is evident that the value of the coefficient is the major determining factor in the number of clusters formed. In the Single-Pass method, the number of processors used has no effect on the number or composition of the clusters formed. In other words, the 6 clusters formed with the 32 document set, in random order with a coefficient of 0.2 are the same whether the process was run on 1 processor or 16 processors. It is interesting to note that the ordering scheme TA and UA tend to provide the most clusters while the schemes TD and UD provide the least. It should be made clear that it has yet to be determined if there is a combination of [D, O, C] which results in an optimal clustering of any document set.

Tables 2, 3, 4, and 5, represent the time it takes to do the process on 1, 2, 4, and 16 processors. Table 2 is the process time on one processor. As such, it reflects the process time on the typical sequential machine. This is the basis for comparison as more processors are added to a system. The time it takes to perform the process on multiple processors has two main components. The first component is the time it takes to do actual processing, e.g. mathematical operations. The second component is the time it takes to do internal message passing. The times depicted in tables 3, 4, and 5 are the combined total of the two components for each [D, O, C, P ] combination. The effects of the components will be explained in accompanying narrative. There are three factors which are used in evaluating the process. The first is simply the time to perform the algorithm. The second factor is speedup which indicates how much faster an algorithm runs as more processors are added. It is a value ranging from 1 to P, the number of processors. The third factor is efficiency, or how much effort is each processor contributing to the accomplishment of a task. Efficiency is a value of 0 to 1. In general, the higher the speedup and efficiency the better an algorithm performs. It is also generally accepted that the best speedup which can be attained is when speedup is the same as the number of processors and the best that efficiency can be is 1. Speedup and efficiency can be mathematically defined by:

$$\text{(a) } S_P = \frac{T_1}{T_P} \quad \text{(b) } \eta_P = \frac{S_P}{P} \tag{4}$$

$S_P$ = Speedup with $P$ processors $T_1$ = Time with 1 processor $T_P$ = Time with $P$ processors $\eta_P$ = Efficiency with $P$ processors Table 2 indicates the time, in seconds, it takes to form the clusters for each configuration using 1 processor. This becomes the basis for comparison of the process as more processors are added. Each time represents a combination of the four parameters [D, O, C, P ] so conclusions are described in terms of isolating parameters. As D, O, and P are held constant, it is clear that increasing C causes an increase in execution time. For example [32,R,0.2,1] takes 0.937 seconds whereas [32,R,0.4,1] takes 1.354 seconds, [32,R,0.6,1] takes 2.361 seconds and [32,R,0.8,1] takes 2.495 seconds. In general, it can be seen that the time increases as C increases. In other words, it takes longer to make more clusters which is intuitive. It is also intuitive that it takes one processor longer to perform the algorithm as the number of documents increase. This is evident in holding O, C, P constant and allowing D to change from 32 to 64 and then to 128.

Table 3 is the time to perform the algorithm for each permutation with two processors or [D, O, C, 2]. It can be seen that for permutations where C=0.2, the algorithm does worse than with 1 processor. This is to be expected given the nature of the Single-Pass method. As previously stated, the Single-Pass tends to put documents into the first clusters. So the first processor is initially doing work while the second processor is idle. This accounts for poor speedup and efficiency as well. In effect, only one of the processors is working. Note, however, that as the value of C increases, so does the number of clusters. As these clusters are apportioned, there is more work to do and each processor takes on a more even distribution of the load. This is especially seen as both D and C increase.

Table 4 shows the times to perform clustering with four processors, and Table 5 represents the results of using 16 processors. Tables 6 through 8 reflect the speedup for P=2, 4, and 16, respectively. By definition, there is no speedup when only one processor is used. The values in these tables were derived from equation (4)(a). Equation (4)(b) was used to determine the efficiency of the invention as the number of processors increases. The results are available for 2, 4, and 16 processors in Tables 9 through 11. A graphic representation of the results is presented in FIGS. 5 through 9. For clarity, the results of O=TA has been isolated.

To show the effects of the invention over a range of document set sizes, various graphs are superimposed over the same set of axis. To allow for superimposing the graphs, a special notation has been adopted. "T" represents time, the digit represents the number of processors and the number following the underscore represents the size of the document set. So T1_32 represents the time needed for 1 processor operating on 32 documents. In a similar fashion, T16_128 represents the time for 16 processors operating on 128 documents. The use of "C" along the bottom axis represents the value of the coefficient (0.2 through 0.8). The subscripted letter, j, serves as a counter to ensure the alignment of results of the documents sets with the appropriate value of the coefficient. "S" is used to represent speedup. S32 represents speedup for 32 documents, S64 is speedup for 64 documents etc. Again, the subscripted letter, j, ensures proper alignment of speedup based on the document sets and the coefficient. In the final figure, the "P" represents the number of processors used with "j" aligning results for each value of "P".

FIG. 5 shows the time to cluster the document sets for each value of C and D. As intuition would indicate, it longer to cluster a larger number of documents into a larger number of clusters. The significance of FIG. 5 is in how it compares to the performance as the number of processors increases. The subsequent figures represent time with various values of P. The speedup chart which accompanies each time chart reflects the performance of a given value of P compared P=1.

FIG. 6 displays the results of using 2 processors. The chart shows a decrease in time using the 2 processors versus using 1 processor. The speedup chart reflects how much faster the invention is performing. To determine the speedup select the coefficient of interest, for example 0.6. Draw a line straight up until that line intersects with the lines representing the document set of interest, for example, S128. From the intersection point draw a line straight to the left. The point where this line intersects the vertical axis is the speedup. With the values of C=0.6, and D=128 (S128) the speedup is 1.79. In other words, [128, TA,0.6,2] is 1.79 times faster than [128,TA,0.6,1].

The next figures represent results for P=4 and P=16. In all cases it can be seen that the speedup is better as D and C increase. It is clear from FIG. 8 that there is a marked increase in the performance of the invention as D, C, and P have increased.

FIG. 9 isolates O=TA and C=0.8 to better show time to perform the clustering and the invention's speedup across an increase in P. FIG. 9 shows several things. First it is clear that speedup will decrease if D is constant and P is allowed to increase. Clearly, the invention takes less time as the number of processors increase. However, note that the curve for D=128 continues to decrease. It is important to note that speedup is increasing as both D and P increase. For example, the D=32 has a break point at P=4. This break point indicates it takes longer to perform the clustering as the number of processors increases. This increase is caused because the document set is not large enough to keep each processor productively employed. Also, as the number of processors increases, so to does the amount of time spent passing messages. The breakpoint is an indicator of when the messaging overhead takes longer than the processing time to perform the clustering. The break point is not yet reached for D=64 but is flattening out. The figure clearly shows that D=128 is still rising at P=16 which indicates P can increase and still provide reasonable speedup performance. More importantly, the figure shows two significant trends. The first is that performance is better if D increases while P is held constant. The other trend is the increased performance of the algorithm for increases in D and P. These results clearly show the invention does as stated: that is efficient clustering of large document sets in a practical parallel environment.

| D | O | C | | | |
|---|---|---|---|---|---|
| Documents | Order | Coef = 0.2 | Coef = 0.4 | Coef = 0.6 | Coef = 0.8 |
| 32 | R | 6 | 19 | 30 | 32 |
| | TA | 9 | 20 | 30 | 32 |
| | TD | 5 | 17 | 30 | 32 |
| | UA | 9 | 19 | 30 | 32 |
| | UD | 5 | 17 | 30 | 32 |
| 64 | R | 6 | 34 | 53 | 56 |
| | TA | 10 | 38 | 53 | 58 |
| | TD | 4 | 32 | 53 | 58 |
| | UA | 10 | 37 | 53 | 58 |
| | UD | 4 | 34 | 53 | 58 |
| 128 | R | 8 | 52 | 97 | 120 |
| | TA | 11 | 60 | 101 | 122 |
| | TD | 6 | 49 | 94 | 122 |
| | UA | 11 | 57 | 100 | 122 |
| | UD | 6 | 53 | 96 | 122 |

Table 1 represents number of clusters based on number of documents, order of documents and coefficient of similarity.

| D | O | C | | | |
|---|---|---|---|---|---|
| Documents | Order | Coef = 0.2 | Coef = 0.4 | Coef = 0.6 | Coef = 0.8 |
| 32 | R | 0.937 | 1.354 | 2.361 | 2.495 |
| | TA | 0.560 | 1.530 | 2.138 | 2.241 |
| | TD | 1.270 | 1.770 | 2.719 | 2.795 |
| | UA | 0.551 | 1.535 | 2.124 | 2.239 |
| | UD | 1.280 | 1.761 | 2.712 | 2.789 |
| 64 | R | 2.651 | 5.488 | 8.377 | 8.680 |
| | TA | 1.432 | 5.019 | 6.470 | 7.058 |
| | TD | 3.429 | 6.287 | 9.131 | 9.456 |
| | UA | 1.592 | 4.898 | 6.393 | 7.019 |
| | UD | 3.438 | 6.330 | 9.114 | 9.458 |
| 128 | R | 7.278 | 17.913 | 27.252 | 29.419 |
| | TA | 3.591 | 10.354 | 20.219 | 24.969 |
| | TD | 8.881 | 16.749 | 27.561 | 32.071 |
| | UA | 3.538 | 9.686 | 19.435 | 24.937 |
| | UD | 8.938 | 15.521 | 28.184 | 32.152 |

Table 2 represents the time required to form clusters using D = 1. Time includes the processing time and the messaging time.

| D | O | C | | | |
|---|---|---|---|---|---|
| Documents | Order | Coef = 0.2 | Coef = 0.4 | Coef = 0.6 | Coef = 0.8 |
| 32 | R | 1.115 | 1.273 | 1.541 | 1.525 |
| | TA | 0.815 | 1.087 | 1.310 | 1.362 |
| | TD | 1.577 | 1.317 | 1.671 | 1.693 |
| | UA | 0.766 | 1.064 | 1.363 | 1.357 |
| | UD | 1.477 | 1.372 | 1.690 | 1.690 |
| 64 | R | 3.028 | 4.131 | 4.657 | 5.148 |
| | TA | 1.729 | 3.259 | 3.717 | 3.886 |
| | TD | 3.860 | 4.492 | 5.168 | 5.266 |
| | UA | 1.719 | 3.230 | 3.731 | 3.958 |
| | UD | 3.821 | 4.041 | 5.158 | 5.251 |

-continued

| D Documents | O Order | C Coef = 0.2 | Coef = 0.4 | Coef = 0.6 | Coef = 0.8 |
|---|---|---|---|---|---|
| 128 | R | 5.955 | 12.279 | 14.580 | 16.227 |
|  | TA | 4.002 | 8.069 | 11.297 | 13.015 |
|  | TD | 9.561 | 12.068 | 15.792 | 17.384 |
|  | UA | 3.937 | 8.002 | 11.152 | 13.312 |
|  | UD | 9.617 | 10.554 | 15.885 | 16.951 |

Table 3 represents the time required to form clusters using D = 2. Time includes the processing time and messaging time.

| D Documents | O Order | C Coef = 0.2 | Coef = 0.4 | Coef = 0.6 | Coef = 0.8 |
|---|---|---|---|---|---|
| 32 | R | 1.204 | 1.014 | 1.087 | 1.089 |
|  | TA | 0.803 | 0.829 | 0.943 | 0.944 |
|  | TD | 1.489 | 1.148 | 1.201 | 1.172 |
|  | UA | 0.896 | 0.850 | 0.956 | 1.040 |
|  | UD | 1.511 | 1.219 | 1.156 | 1.181 |
| 64 | R | 2.981 | 2.844 | 2.867 | 3.141 |
|  | TA | 1.751 | 2.157 | 2.288 | 2.392 |
|  | TD | 3.841 | 3.55 | 3.031 | 3.146 |
|  | UA | 1.846 | 1.973 | 2.288 | 2.408 |
|  | UD | 3.849 | 2.857 | 3.050 | 3.138 |
| 128 | R | 7.951 | 8.529 | 8.450 | 9.463 |
|  | TA | 4.023 | 5.303 | 6.469 | 7.243 |
|  | TD | 9.670 | 8.560 | 8.618 | 9.428 |
|  | UA | 4.020 | 5.084 | 6.405 | 7.305 |
|  | UD | 9.672 | 7.209 | 8.707 | 9.258 |

Table 4 represents the time required to form clusters using D = 4. Time includes the processing time and the messaging time.

| D Documents | O Order | C Coef = 0.2 | Coef = 0.4 | Coef = 0.6 | Coef = 0.8 |
|---|---|---|---|---|---|
| 32 | R | 1.474 | 1.252 | 1.216 | 1.237 |
|  | TA | 1.292 | 1.071 | 1.170 | 1.192 |
|  | TD | 1.740 | 1.371 | 1.303 | 1.257 |
|  | UA | 1.315 | 1.252 | 1.158 | 1.231 |
|  | UD | 1.776 | 1.400 | 1.247 | 1.219 |
| 64 | R | 3.250 | 2.071 | 2.145 | 2.138 |
|  | TA | 2.209 | 1.911 | 1.922 | 1.903 |
|  | TD | 3.919 | 2.557 | 2.376 | 2.144 |
|  | UA | 2.253 | 1.952 | 1.957 | 1.916 |
|  | UD | 3.950 | 2.450 | 2.178 | 2.069 |
| 128 | R | 8.076 | 4.500 | 4.410 | 4.549 |
|  | TA | 4.624 | 3.884 | 3.760 | 4.004 |
|  | TD | 9.649 | 4.802 | 4.435 | 4.683 |
|  | UA | 4.491 | 3.987 | 3.812 | 3.945 |
|  | UD | 9.587 | 4.740 | 4.510 | 4.491 |

Table 5 represents the time required to form clusters using D = 16. Time includes the processing time and the messaging time.

| D Documents | O Order | C Coef = 0.2 | Coef = 0.4 | Coef = 0.6 | Coef = 0.8 |
|---|---|---|---|---|---|
| 32 | R | 0.840 | 1.064 | 1.532 | 1.636 |
|  | TA | 0.687 | 1.408 | 1.632 | 1.645 |
|  | TD | 0.805 | 1.344 | 1.627 | 1.651 |
|  | UA | 0.710 | 1.443 | 1.558 | 1.650 |
|  | UD | 0.867 | 1.284 | 1.605 | 1.650 |
| 64 | R | 0.875 | 1.328 | 1.799 | 1.686 |
|  | TA | 0.828 | 1.540 | 1.741 | 1.816 |
|  | TD | 0.888 | 1.400 | 1.767 | 1.796 |
|  | UA | 0.926 | 1.516 | 1.713 | 1.773 |
|  | UD | 0.9 | 1.566 | 1.767 | 1.801 |
| 128 | R | 1.222 | 1.459 | 1.869 | 1.813 |
|  | TA | 0.897 | 1.283 | 1.790 | 1.918 |
|  | TD | 0.929 | 1.388 | 1.745 | 1.845 |
|  | UA | 0.899 | 1.210 | 1.743 | 1.873 |
|  | UD | 0.929 | 1.471 | 1.774 | 1.897 |

Table 6 represents the speedup attained using D = 2.

| D Documents | O Order | C Coef = 0.2 | Coef = 0.4 | Coef = 0.6 | Coef = 0.8 |
|---|---|---|---|---|---|
| 32 | R | 0.778 | 1.335 | 2.172 | 2.291 |
|  | TA | 0.697 | 1.846 | 2.267 | 2.374 |
|  | TD | 0.853 | 1.542 | 2.264 | 2.385 |
|  | UA | 0.615 | 1.806 | 2.222 | 2.153 |
|  | UD | 0.847 | 1.445 | 2.346 | 2.362 |
| 64 | R | 0.889 | 1.930 | 2.922 | 2.763 |
|  | TA | 0.818 | 2.327 | 2.828 | 2.951 |
|  | TD | 0.893 | 1.771 | 3.013 | 3.006 |
|  | UA | 0.862 | 2.483 | 2.794 | 2.915 |
|  | UD | 0.893 | 2.216 | 2.988 | 3.014 |
| 128 | R | 0.915 | 2.100 | 3.225 | 3.109 |
|  | TA | 0.893 | 1.952 | 3.126 | 3.447 |
|  | TD | 0.918 | 1.957 | 3.198 | 3.402 |
|  | UA | 0.880 | 1.905 | 3.034 | 3.414 |
|  | UD | 0.924 | 2.153 | 3.237 | 3.473 |

Table 7 represents the speedup attained using D = 4.

| D Documents | O Order | C Coef = 0.2 | Coef = 0.4 | Coef = 0.6 | Coef = 0.8 |
|---|---|---|---|---|---|
| 32 | R | 0.636 | 1.081 | 1.942 | 2.017 |
|  | TA | 0.433 | 1.429 | 1.827 | 1.880 |
|  | TD | 0.730 | 1.291 | 2.087 | 2.224 |
|  | UA | 0.419 | 1.226 | 1.834 | 1.819 |
|  | UD | 0.721 | 1.258 | 2.175 | 2.288 |
| 64 | R | 0.816 | 2.650 | 3.905 | 4.060 |
|  | TA | 0.648 | 2.626 | 3.366 | 3.709 |
|  | TD | 0.875 | 2.459 | 3.843 | 4.410 |
|  | UA | 0.707 | 2.509 | 3.267 | 3.663 |
|  | UD | 0.870 | 2.584 | 4.185 | 4.571 |
| 128 | R | 0.901 | 3.981 | 6.180 | 6.467 |
|  | TA | 0.777 | 2.666 | 5.377 | 6.236 |
|  | TD | 0.920 | 3.488 | 6.214 | 6.848 |
|  | UA | 0.788 | 2.429 | 5.098 | 6.321 |
|  | UD | 0.932 | 3.274 | 6.249 | 7.159 |

Table 8 represents the speedup attained using D = 16.

| D Documents | O Order | C Coef = 0.2 | Coef = 0.4 | Coef = 0.6 | Coef = 0.8 |
|---|---|---|---|---|---|
| 32 | R | 0.420 | 0.532 | 0.766 | 0.818 |
|  | TA | 0.343 | 0.704 | 0.816 | 0.822 |
|  | TD | 0.403 | 0.672 | 0.813 | 0.826 |
|  | UA | 0.359 | 0.721 | 0.779 | 0.825 |
|  | UD | 0.433 | 0.642 | 0.803 | 0.825 |
| 64 | R | 0.438 | 0.664 | 0.900 | 0.843 |
|  | TA | 0.414 | 0.770 | 0.871 | 0.908 |
|  | TD | 0.444 | 0.700 | 0.883 | 0.898 |
|  | UA | 0.463 | 0.758 | 0.857 | 0.887 |
|  | UD | 0.450 | 0.783 | 0.883 | 0.900 |

| D | O | C | | | |
|---|---|---|---|---|---|
| Documents | Order | Coef = 0.2 | Coef = 0.4 | Coef = 0.6 | Coef = 0.8 |
| 128 | R | 0.611 | 0.729 | 0.934 | 0.906 |
|  | TA | 0.449 | 0.641 | 0.895 | 0.959 |
|  | TD | 0.465 | 0.694 | 0.873 | 0.923 |
|  | UA | 0.449 | 0.605 | 0.872 | 0.937 |
|  | UD | 0.465 | 0.735 | 0.887 | 0.948 |

Table 9 represents the efficiency attained using D = 2.

| D | O | C | | | |
|---|---|---|---|---|---|
| Documents | Order | Coef = 0.2 | Coef = 0.4 | Coef = 0.6 | Coef = 0.8 |
| 32 | R | 0.194 | 0.334 | 0.543 | 0.573 |
|  | TA | 0.174 | 0.461 | 0.567 | 0.594 |
|  | TD | 0.213 | 0.386 | 0.566 | 0.596 |
|  | UA | 0.154 | 0.451 | 0.555 | 0.538 |
|  | UD | 0.212 | 0.361 | 0.586 | 0.590 |
| 64 | R | 0.222 | 0.482 | 0.730 | 0.691 |
|  | TA | 0.205 | 0.582 | 0.707 | 0.738 |
|  | TD | 0.223 | 0.443 | 0.753 | 0.752 |
|  | UA | 0.215 | 0.621 | 0.698 | 0.729 |
|  | UD | 0.223 | 0.554 | 0.747 | 0.753 |
| 128 | R | 0.229 | 0.525 | 0.806 | 0.777 |
|  | TA | 0.223 | 0.488 | 0.781 | 0.862 |
|  | TD | 0.229 | 0.489 | 0.799 | 0.850 |
|  | UA | 0.220 | 0.476 | 0.758 | 0.854 |
|  | UD | 0.231 | 0.538 | 0.809 | 0.868 |

Table 10 represents the efficiency attained using D = 4.

| D | O | C | | | |
|---|---|---|---|---|---|
| Documents | Order | Coef = 0.2 | Coef = 0.4 | Coef = 0.6 | Coef = 0.8 |
| 32 | R | 0.040 | 0.068 | 0.121 | 0.126 |
|  | TA | 0.027 | 0.089 | 0.114 | 0.117 |
|  | TD | 0.046 | 0.081 | 0.130 | 0.139 |
|  | UA | 0.026 | 0.077 | 0.115 | 0.114 |
|  | UD | 0.045 | 0.079 | 0.136 | 0.143 |
| 64 | R | 0.051 | 0.166 | 0.244 | 0.254 |
|  | TA | 0.041 | 0.164 | 0.210 | 0.232 |
|  | TD | 0.55 | 0.154 | 0.240 | 0.276 |
|  | UA | 0.044 | 0.157 | 0.204 | 0.229 |
|  | UD | 0.054 | 0.162 | 0.262 | 0.286 |
| 128 | R | 0.056 | 0.249 | 0.386 | 0.404 |
|  | TA | 0.049 | 0.167 | 0.336 | 0.390 |
|  | TD | 0.058 | 0.218 | 0.388 | 0.428 |
|  | UA | 0.049 | 0.152 | 0.319 | 0.395 |
|  | UD | 0.058 | 0.205 | 0.391 | 0.447 |

Table 11 represents the efficiency attained using D = 16.

We claim:

1. In an arrangement of parallel processors in a computer information processing system, a parallel clustering method for examining preselected documents and grouping similar documents in the parallel processors for subsequent retrieval in an electronic digital format from the computer information processing system, the steps comprising:

converting each preselected document into an electronic document in digital format;

converting each electronic document into a vector, whereby a vector is a weighted list of the occurence of different words and terms that appear in the document;

selecting a first electronic document and designating the vector of the first electronic document as a first cluster vector whereby a cluster vector is the mathematical average of all of the document vectors having similar characteristics, and assigning the first cluster vector to a first processor of the parallel processors;

selecting a second electronic document and comparing the vector of the second electronic document with the first cluster vector to determine if the second document vector has similar characteristics, and assigning the second document vector to the first cluster vector if they have similar characteristics or designating the second document vector as a second cluster vector and assigning the second cluster vector to a second processor of the parallel processors if there are different characteristics; and selecting each subsequent electronic document and comparing the vector of each subsequent electronic document with all existing cluster vectors simultaneously on each processor having a cluster vector, and assigning each subsequent document vector to a parallel processor having the most similar characteristics or designating the subsequent document vector as a subsequent cluster vector and assigning the subsequent cluster vector to a processor of the parallel processors if there are different characteristics.

* * * * *